(No Model.)
W. SOBEY.
HARROW.
No. 485,020. Patented Oct. 25, 1892.
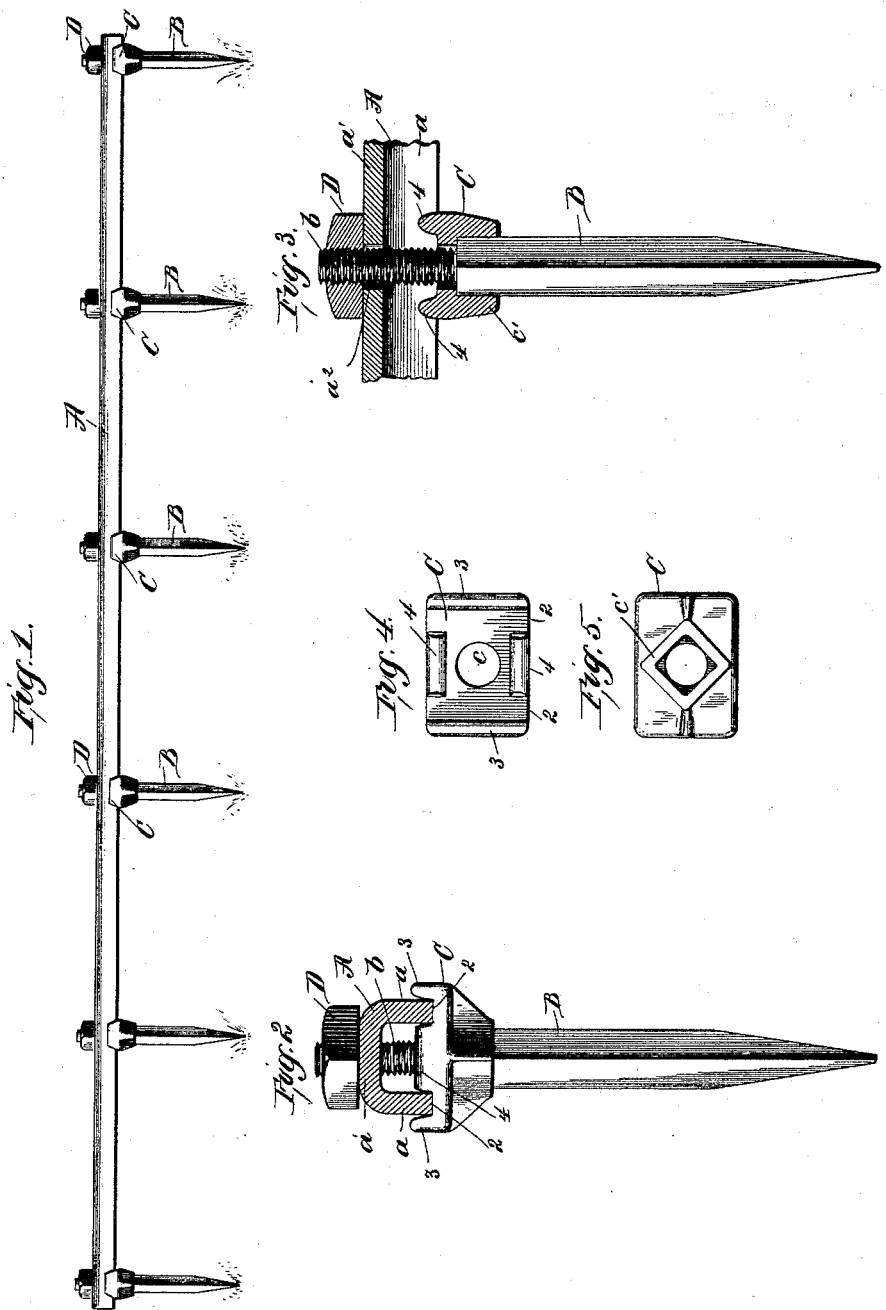

UNITED STATES PATENT OFFICE.

WILLIAM SOBEY, OF RACINE, WISCONSIN, ASSIGNOR TO THE J. I. CASE PLOW WORKS, OF SAME PLACE.

HARROW.

SPECIFICATION forming part of Letters Patent No. 485,020, dated October 25, 1892.

Application filed September 22, 1890. Serial No. 365,712. (No model.)

*To all whom it may concern:*

Be it known that I, WILLIAM SOBEY, a citizen of the United States, residing at Racine, in the county of Racine, State of Wisconsin, have invented certain new and useful Improvements in Harrows, of which I do declare the following to be a full, clear, and exact description, reference being had to the accompanying drawings, forming part of this specification.

This invention relates to the manufacture of harrows, and more particularly does it relate to that class of harrows in which metal bars are employed as a means for sustaining the harrow-teeth.

The object of the invention is to provide an improved construction of beam or tooth-bar for harrows that shall be strong, durable, and light, and to provide improved means whereby the teeth may be readily connected therewith in such manner that they can be conveniently shifted from time to time, so that as one angle of the tooth becomes rounded by wear, and thus loses its cutting qualities, the position of the tooth can be changed so as to bring another angle of the tooth into the line of draft, and so on until each corner of the tooth has in turn been used, by which time the corner first used will be found to have been more or less sharpened by the wear during the exposure of the other corners and can be again presented to the line of draft.

The invention consists in the novel features of construction hereinafter described, illustrated in the accompanying drawings, and particularly defined in the claims at the end of this specification.

Figure 1 is a view in front elevation of the tooth-bar or beam embodying my invention. Fig. 2 is a view in vertical cross-section through the tooth-bar. Fig. 3 is a view in vertical longitudinal section through the tooth-bar, the clamping-plate, and the retaining-nut, the harrow-tooth being shown in elevation. Fig. 4 is a detail plan view of the clamping-plate. Fig. 5 is a detail inverted plan view of the clamping-plate.

In the drawings I have illustrated only one bar of a harrow-frame; but it will be readily understood by those skilled in the art that in practice the frames may be of usual construction, the bars being employed in any desired number and with any desired number and arrangement of teeth.

A designates the beam or tooth-bar, constructed, preferably, of wrought-iron or steel and of U shape in cross-section, although it will be readily understood that the precise shape of the bar may be varied, so long as the bar is of the form known as "channel-iron"—that is to say, of any shape presenting sides connected together by a web or back. Practice has demonstrated that a bar of this construction is adapted to give great strength, durability, and lightness and can be produced at a very small expense. In constructing the harrow-frame the sides $a$ of each bar extend downwardly, the back $a'$ of the bar being uppermost, and in the back $a'$ of the bar are formed any desired number of perforations $a^2$, corresponding to the number of harrow-teeth that are to be employed. The harrow-teeth B are preferably of squared shape and are set in such position with respect to the bar A that the corners of the teeth shall be presented to the line of draft. The upper portion of each tooth B is provided with a shank $b$, adapted to extend through a clamp or plate C and through the corresponding perforation $a^2$ in the back of the bar A. The clamp or plate C is suitably adapted to engage with the bar A and to engage, also, with the harrow-tooth, so that when the clamp is in position for use it will prevent the turning of the harrow-tooth with respect to the bar. Any convenient means may be employed for effecting the engagement between the clamp-plate C and the bar and between this plate and the harrow-teeth; but the preferred construction of clamp-plate is that illustrated in the drawings. In such preferred construction the upper face of the harrow-plate is provided with grooves 2, in which will set the edges of the sides $a$ of the bar A, these grooves being formed by the flanges or extensions 3 and by the lugs or extensions 4, that rise from the face of the clamp or plate C. Through the clamp or plate C is formed a perforation $c$, through which will pass the upper portion or shank of the harrow-tooth B, and the under face of the clamp or plate C is furnished with a seat or socket $c'$, corresponding in shape to the form of the harrow-tooth. Hence it will be seen that when the upper portion of the harrow-tooth B has been passed through the perforation c of the clamp or plate C and the plate has been set in such position with respect to the bar A that the sides a of the bar enter the grooves 2 of the clamp or plate C the extensions upon the upper face of the clamp or plate will prevent the turning of this clamp or plate with respect to the harrow-bar A, and consequently will hold the teeth in accurate working position, so as to properly expose their corners to the line of draft.

While I regard the construction of clamp or plate C as best suited for the purpose of holding the tooth in position with respect to the harrow-bar A, it is obvious that this construction may be varied and that the projections or extensions 3 and 4 need only be used in such number and arrangement as will prevent the turning of the clamp or plate C with respect to the bar. So, also, instead of the squared seat or socket upon the under face of the clamp or plate any other convenient means may be employed for holding the clamp and tooth in position. The upper portion or shank b of the harrow-tooth B, that extends above the back of the bar A, is screw-threaded to receive a nut D, which serves to hold the parts together after they have been set in position for use.

From the foregoing description it will be seen that when it is desired to change the position of the teeth as the angles become worn or rounded by use it is only necessary to loosen the nut D, then sufficiently withdraw the tooth B from the harrow-bar A and clamp C to free the squared portion of the tooth from the seat or socket c', and then turn the tooth a quarter-revolution, so as to present a new angle of the tooth to the line of draft, after which the nut D will be again set to hold the tooth in its new position with respect to the bar A. This shifting of the tooth B may be done from time to time until each angle of the tooth has been in turn presented to the line of draft, by which time the angle first presented will be found to have become sufficiently sharpened by the wear in opposite directions to enable it to be again used. It will be found, moreover, that the means employed for attaching the harrow-teeth will enable new teeth to be inserted to replace such as may have become worn out or broken by long or severe usage.

Having thus described my invention, what I claim as new, and desire to secure by Letters Patent, is—

1. In a harrow, a tooth-bar of channel form, having two sides with integral connecting-back, and a series of individual clamp-plates for the harrow-teeth, formed separate from the harrow-teeth, each of said clamp-plates having a suitable projection or projections to engage the side plate or plates of the tooth-bar and adapted to hold the harrow-tooth against rotation, in combination with the harrow-teeth passing through said separate individual clamp-plates and the back of said bar and fastening devices directly engaging the ends of the harrow-teeth and binding the individual clamp-plates against the tooth-bar, substantially as described.

2. In a harrow, a tooth-bar of channel form, having two sides with integral connecting-back, said back being perforated to receive the shanks of the harrow-teeth, a series of individual clamp-plates formed separate from the harrow-teeth and provided each with an angular seat to receive a harrow-tooth and adapted to engage said bar, and a series of harrow-teeth projecting through said individual clamp-plates and through said bar, and fastening devices directly engaging the ends of the harrow-teeth and binding the individual clamp-plates against the tooth-bar, substantially as described.

3. The combination, with a perforated tooth-bar formed of channel form with integral sides and back, of a series of perforated clamp-plates having each a projection or projections to engage said bar and adapted, also, to engage the sides of the harrow-tooth and lock said tooth against rotation, and a series of harrow-teeth, each having its shank or upper portion extending through its individual clamp-plate, and fastening devices directly engaging the upper ends of the harrow-teeth and binding the individual clamp-plates against the tooth-bar, substantially as described.

4. In a harrow, a tooth-bar of channel form, having two sides with integral connecting-back, and a series of individual perforated clamp-plates adapted to embrace said sides of the tooth-bar, in combination with the harrow-teeth passing through said individual clamp-plates and the back of said tooth-bar and fastening devices directly engaging the ends of the teeth and binding the clamp-plates against the tooth-bar, substantially as described.

5. In a harrow, a tooth-bar of channel form, having two sides with a connecting-back, and a clamp-plate having flanges adapted to abut against the inside of said sides, in combination with a tooth passing through said plate and the back of said bar and means, substantially as specified, for securing the same therein, as and for the purposes set forth.

6. In a harrow, a tooth-bar of channel form, having two sides and a connecting-back, and a clamp or plate having grooves adapted to receive said sides, in combination with a tooth passing through said plate and the back of said bar and means, substantially as described, for retaining said tooth and plate removably in position, as and for the purpose set forth.

7. In a harrow, a tooth-bar of channel form, having two sides with integral connecting-back, a series of individual perforated clamps or plates, one for each of the harrow-teeth, said clamps or plates being adapted to engage the sides of the tooth-bar, and a series of harrow-teeth, each having its upper end adapted to pass through its individual clamp or plate and the back of the tooth-bar and having a shoulder adapted to abut against the under side of its clamp or plate, and a screw-thread and nut at the upper end of each of said teeth at the outside of said back, substantially as and for the purpose specified.

8. In a harrow, the combination of a tooth-bar of channel form, having two sides with integral connecting-back, a series of perforated clamps or plates adapted to engage said sides, said plates and back having circular apertures therein for the insertion of the teeth and said plates having each an angular seat or countersink on its under side around said aperture, a series of teeth having each an upper cylindrical portion and adapted to pass through said apertures, the lower angular portion terminating in a shoulder adapted to fit said seat or countersink, and a screw-thread and nut at said cylindrical end, substantially as and for the purpose specified.

9. The combination, with a U-shaped tooth-bar of a harrow, of a flanged clamp-plate fitting the bottom and sides thereof, said tooth-bar and clamp-plate being provided with a circular aperture therethrough and the said clamp-plate having an angular seat or countersink around said aperture on the under side thereof, and a tooth having an upper cylindrical portion adapted to fit said aperture and a lower angular portion terminating in a shoulder adapted to fit said seat or countersink, and a screw-thread and nut on said upper portion, substantially as and for the purpose herein specified.

WILLIAM SOBEY.

Witnesses:
CHARLES H. LEE,
GEO. L. EDDY.